ated Oct. 25, 1955

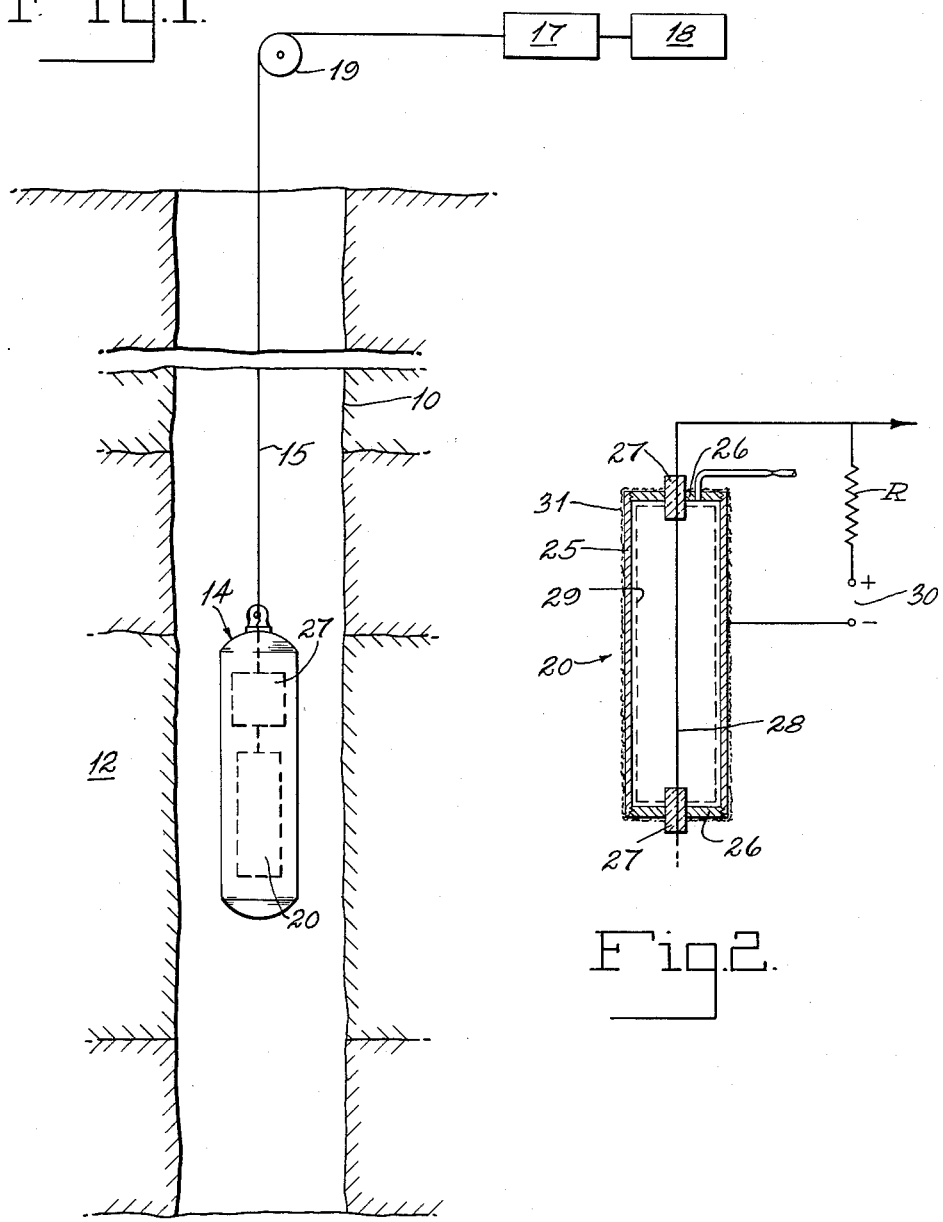

2,721,944

METHOD OF AND APPARATUS FOR EXPLORING RADIOACTIVE STRATA

Raymond J. Ruble, Beacon, N. Y., assignor to Texaco Development Corporation, New York, N. Y., a corporation of Delaware Application September 9, 1950, Serial No. 183,963

12 Claims. (Cl. 250—83.1)

This invention relates to a method of, and apparatus for, exploring radioactive strata and particularly that from which there is emanation of gamma radiation of different degrees of energy. The invention is particularly concerned with differentiating between gamma rays of different energy levels.

The invention broadly contemplates a method of differentiating between gamma rays of high and low energy levels, respectively, by placing in close proximity to the strata being explored a substance which reacts with gamma rays of a selected high energy level to produce neutrons, the substance being substantially non-sensitive toward gamma rays of lower energy level, and detecting the neutrons so produced as an indication or measure of the quantity of said high energy gamma radiation. More specifically, the neutron detection may be effected by placing a neutron-sensitive material in close proximity to the aforesaid substance at a locus of neutron formation under conditions such that ionizing particles are ejected from the material. The resulting ionizing particles are subjected to contact with ionizable gas in an electrical field, thereby producing electrical impulses indicative of the quantity of selected high energy level gamma radiation.

The invention contemplates an apparatus for carrying out the aforesaid method of exploration. In accordance with the invention, there is passed in close proximity to the strata being explored a radiation detector device comprising a cathode envelope containing ionizable gas and having at its exterior surface a substance which reacts with the gamma rays of selected high energy level to produce neutrons. In the interior of the envelope is a neutron-sensitive material which is reactive with neutrons to form ionizing particles. An anode member is provided within the cathode envelope with means for applying an electrical field between the cathode and anode as well as means for conducting electrical pulses away from the device (as described in more detail later).

The invention is useful in differentiating between hard and soft gamma rays as, for example, in the surface exploration for sub-surface deposits of radioactive material. For example, gamma rays of widely varying degrees of energy may emanate from formations containing uranium, high energy rays coming from the uranium and its degradation products and rays of relatively lower energy coming from the surrounding formation. Exploration of such strata or formation with a detector which is sensitive only to the high energy gamma rays thus provides an effective means of determining the location of the uranium deposit within the formation.

The invention is also useful in exploring earth bores, such as in oil producing fields, and may be adapted for use in any bore where it is desired to differentiate between hard and soft or between gamma rays of different degrees of energy. For example, in neutron-gamma ray well logging it is desirable to discriminate between the higher energy neutron-induced gamma rays, having energies of about 2 m. e. v. (million electron volts), and the lower energy natural gamma ray radiation which has an average energy of about 1 m. e. v.

In general, it is contemplated detecting gamma rays having energies at least equal to 1.69 m. e. v.

In detecting gamma rays of this energy level, the cathode envelope of the device of this invention advantageously has an exterior coating of beryllium-9. Gamma radiation of about 1.69 m. e. v. and higher reacts with beryllium to produce neutrons:

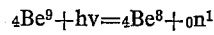

In the case of deuterium, gamma radiation having an energy of 2.17 m. e. v. is required to cause the following reaction to take place:

Accordingly, when detecting gamma radiation having an energy level of about 2.17 m. e. v. and higher, the cathode envelope is advantageously coated with a material containing deuterium, such as solid deuterocarbons or deuterium oxide (heavy water), or the detection device is provided with a content of deuterium gas.

Where it is desired to detect gamma rays of selected and still higher energy levels other substances may be chosen which are sensitive to the particular selected gamma rays and substantially non-sensitive to gamma rays of lower energy levels. For example, in detecting gamma rays having energy of the order of 4 m. e. v., a coating material may be chosen which contains the element fluorine-19, such as one of the fluorides or fluorocarbons. Magnesium-25, lithium-7 and neon-21 may be used for detecting gamma rays in the range of 7 to 7.5 m. e. v.; nitrogen-14 for gamma rays of 10.7 m. e. v.; aluminum-27, silicon-30, boron-11, magnesium-26, phosphorus-31, and sodium-23 for rays of 11.1 to 12.2 m. e. v.; oxygen-16 for 15.6 m. e. v.; carbon-12 for 18.85 m. e. v.; and helium-4 for gamma rays of 20.6 m. e. v. Other elements also exhibit the gamma ray-neutron photoelectric disintegration reaction and the above elements merely exemplify the type of gamma ray discrimination which is possible by proper selection of the coating material.

In order to illustrate the invention, reference will now be made to the figures of the accompanying drawing.

Figure 1 is a vertical elevation showing somewhat diagrammatically the strata surrounding a portion of a bore hole or well. Figure 2 is a vertical section showing diagrammatically the radiation detector of the present invention.

Referring to Figure 1, a bore hole 10 is shown as penetrating several underground formations or sub-strata, one of which is indicated at 12. A logging instrument, represented generally by a housing 14 in the form of an elongated capsule, is adapted to be lowered and raised through a hole by means of a suspending cable 15. This cable contains one or more electrical conductors which serve to conduct the output of the instrument to a linear amplifier 17 at the surface and which is in turn connected to a suitable recorder 18. The cable 15 may also conduct to the instrument in the hole the electric current necessary to energize the elements of which the instrument is comprised. The cable 15 is shown as passing over a pulley or drum 19 which serves to measure the length of the cable and thus the depth of the instrument in the hole, as is well known in the art.

Mounted within the housing 14 is a detecting device 20 advantageously of the proportional counter type as modified in accordance with the present invention. The output of the counter leads to the cable 15 through a suitable linear preamplifier 27 is indicated by dotted lines.

Figure 2 shows somewhat diagrammatically the cross-section of the detector 20, which is of the proportional counter type. The detector comprises a relatively thin cylinder 25 which may be of brass, this cylinder being provided with upper and lower end closure members 26, preferably provided with circumferential threads so that they may be screwed tightly into the ends of the cylinder 25. These ends may be formed of the same material as the cylinder. Each of the end members is provided with a center opening into which an electrical insulator 27, preferably of glass and of tubular form, is tightly fitted. The cylinder 25 forms the cathode of the counter and a fine wire 28 of about 3 mils diameter stretched between the insulators 27 forms the anode of the counter. The anode is maintained at a positive potential with respect to the cathode and a very high resistance R of the order of one megohm is connected in series with the electrode and a source of high potential 30. The potential difference impressed upon the cathode and anode may be of the order of 1000 volts.

The inner surface of the cylinder 25 and of the closure members 26 is coated with a suitable neutron reactive material 29, such as a compound of boron, for example, boron carbide. Instead of a compound of boron, other neutron reactive materials may be used, such as lithium. The coating may be about 3 mils in thickness.

If desired, and in the absence of the foregoing coating on the interior surface of the envelope, a suitable neutron-reactive gas, such as boron trifluoride, may be maintained within the counter. In the counter in which the neutron reactive coating is present, a suitable ionizable gas filling under low pressure is used. A suitable gas of relatively low density may comprise hydrogen, methane, argon, etc.

The exterior surface of the cathode element is coated with a substance 31 capable of reaction with gamma rays characterized by the degree of energy which it is desired to detect and substantially none-resistant to gamma rays of lower energy levels. Thus as previously described, when desired to employ the device for detecting gamma rays having energies at least equal to 1.69 m. e. v., the exterior coating 31 comprises beryllium or a compound of beryllium. This coating may be substantially similar in thickness to that of the inner coating 29.

Instead of coating the exterior surfaces with the desired gamma ray reactive material, the cathode envelope may be maintained surrounded by a layer of gaseous material, such as deuterium, reactive with the desired gamma rays. In such case, the cathode envelope or cylinder is supported within an exterior envelope or container and the annular space between the exterior container and the cathode cylinder is maintained filled with the gamma ray reactive gas.

In the foregoing description of the cathode cylinder, reference has been made to constructing it from brass. However, it is contemplated that other metals may be used, including aluminum, copper, steel, iron, etc. For the detection of very high energy rays of 11.1 m. e. v. the cathode cylinder may be made of aluminum in which case no outside coating of gamma ray reactive material is required since aluminum itself is reactive to gamma rays of this energy. Other suitable metals of construction may be used in a like manner for the detecting of high energy rays having an energy corresponding to the release energy of the material.

In operation, the housing 14 is passed through the hole 10 by means of cable 15 and the depth of the instrument is noted simultaneously with the indication of the meter or recorder 18. During passage through the hole, gamma rays of sufficiently high energy level emanating from the surrounding strata react with the substance in the coating 31, thereby releasing neutrons. The neutrons so released, which are usually relatively slow neutrons, penetrate the metal of the cathode cylinder and react with the neutron-reactive material of the coating 29, thereby releasing ionizable particles.

The thickness of the envelope metal is advantageously chosen so as to prevent alpha or beta particles, released from the gamma ray reactive material, from entering the active or internal volume of the detector.

The ionizable particles so emitted from a coating material, such as boron carbide, comprise alpha particles. The emitted alpha particles cause ionization of the gaseous filling and thereby produce discharges or pulses within the detector. The current discharge in a proportional counter depends on the number of ions which are produced.

The resulting electrical impulses are transmitted from the detector through the cable 15 to the amplifier and recording mechanism located at the surface.

Some low energy gamma radiation may cause secondary ionization to occur and the electrical discharges so caused will be relatively small in size. By means of the linear amplifiers 27 and 17, or other suitable discriminating circuits a selective determination of the discharges can be made, so that only the large size discharges resulting from the primary ionization are received at the recorder 18.

Although a proportional-type of counter is preferred and has been described in the foregoing description, nevertheless it is contemplated that counters involving the principles of ionization chambers and Geiger-Mueller counters may be employed.

It is also contemplated that the invention may have application in surface surveying or exploration rather than in exploring a well bore as has been specifically described above.

Obviously many modifications and variations of the invention, as hereinbefore set forth, may be made without departing from the spirit and scope thereof and, therefore, only such limitations should be imposed as are indicated in the appended claims.

I claim:

1. In the exploration of earth strata by the detection of secondary gamma radiation produced by irradiating the strata with a source of primary radiation the method comprising the steps of irradiating the earth strata with primary radiation to produce secondary radiation including relatively high energy gamma rays, selectively detecting the said relatively high energy gamma rays to the substantial exclusion of relatively low energy gamma rays by placing in close proximity to said strata a substance which reacts with gamma rays of selected high energy to produce neutrons, said substance being substantially non-sensitive toward gamma rays of lower energy level, subjecting said substance to the action of said high energy gamma rays emanating from said strata whereby neutrons are ejected from said substance, maintaining a neutron-sensitive material in close proximity to said substance at a locus of neutron formation, subjecting said material to the action of ejected neutrons whereby ionizing particles are ejected therefrom, and contacting said ionizing particles with ionizable gas in an electrical field thereby producing electrical impulses indicative of the quantity of said high energy gamma radiation.

2. In the exploration of an earth formation by the detection of gamma radiation produced by irridiating the formation with a source of primary neutron radiation, the method comprising the steps of irradiating the earth formation with neutrons to produce secondary radiation including relatively high energy gamma rays and selectively detecting the said relatively high energy gamma rays to the substantial exclusion of relatively low energy gamma rays by passing in close proximity to said formation a substance which reacts with gamma rays of selected high energy to produce neutrons, said substance being substantially non-sensitive toward gamma rays of lower energy level, subjecting said substance to the action of said high energy gamma rays emanating from said earth formation whereby neutrons are ejected from said substance maintaining neutron-sensitive material in close proximity to said substance at a locus of neutron formation, subjecting said material to the action of ejected neutrons whereby ionizing particles are ejected therefrom, and contacting said ionizing particles with ionizable gas in an electrical field thereby producing electrical impulses indicative of the quantity of said high energy gamma radiation.

3. A gamma ray detector adapted to differentiate between gamma rays of different degrees of energy which comprises a device having a cathode envelope containing ionizable gas, a substance disposed about the exterior surface of said cathode envelope which reacts with gamma rays of selected high energy to produce neutrons and which is substantially non-sensitive toward gamma rays of lower energy level, a neutron-sensitive material disposed at the inner surface of said envelope and which is reactive with neutrons to form ionizing particles, an anode member within said cathode envelope, means for applying an electrical field within said cathode envelope and means for conducting electrical pulses away from said device.

4. A gamma ray detector adapted to differentiate between gamma radiation of different degrees of energy which comprises a device having a cathode envelope containing ionizable gas and having its exterior surface coated with a substance which reacts with gamma rays of selected high energy to produce neutrons but which is substantially insensitive to gamma rays of lower energy level, a neutron-sensitive material disposed at the inner surface of said envelope and which is reactive with neutrons to form ionizing particles, an anode member within said cathode envelope, means for applying an electrical field within said envelope and means for conducting electrical pulses away from said device.

5. A device according to claim 4 in which the interior surface of said envelope is coated with neutron-sensitive material.

6. A device according to claim 4 in which the interior surface of said envelope is coated with a compound selected from the group consisting of the compounds of boron and lithium.

7. A device according to claim 3 in which the neutron-sensitive material is in gaseous form.

8. A device according to claim 3 in which the neutron-sensitive material comprises boron trifluoride.

9. A gamma ray detector adapted to differentiate between gamma rays of different degrees of energy which comprises a device having a cathode envelope formed of material comprising a substance such as aluminum which reacts with gamma rays of selected high energy to produce neutrons and which is substantially non-sensitive toward gamma rays of lower energy level, said cathode envelope having in its interior a neutron-sensitive material reactive with neutrons to form ionizing particles, a body of ionizable gas within the envelope, an anode member within said cathode envelope, means for applying an electrical field within said envelope and means for conducting electrical pulses away from said device.

10. In differentiating between gamma rays of high and low energies, respectively, by placing in proximity to the source of said gamma radiation a detector for penetrative radiation, said detector comprising a cathode envelope having an anode member therein and containing ionizable gas maintained in an electrical field, said cathode envelope having adjacent its exterior surface a substance capable of reacting with high energy gamma rays to produce neutrons but substantially non-sensitive toward gamma rays of lower energy level, and having adjacent its interior surface a substance capable of reacting with neutrons to produce ionizing particles, the method comprising subjecting said exterior surface substance to the action of said high energy gamma radiation whereby neutrons are ejected, reacting ejected neutrons with said interior surface substance whereby ionizing particles are ejected into said ionizable gas thereby creating electrical impulses, and measuring resulting electrical impulses as an indication of the quantity of said high energy gamma radiation.

11. A method of selectively detecting gamma rays of energies above a predetermined level and occurring in the presence of other gamma rays having lower energies, comprising the steps of: exposing to all of said rays a substance which interacts selectively with gamma rays above said level to produce neutrons but does not so interact with gamma rays below it; causing said neutrons to come into contact with a substance which reacts selectively therewith to produce heavy, positively-charged, strongly-ionizing particles; causing said ionizing particles to come into contact with an ionizable gas in an electric field of suitable intensity to produce relatively stronger discharge impulses for electron avalanches started by the strongly ionizing heavy particles than for any which may be started by electron byproducts of gamma rays; and applying all of said impulses to an impulse-sensitive electrical circuit to separate the stronger impulses from the weaker.

12. In the exploration of an earth formation from which gamma rays of different energy levels may emanate, the method of selectively detecting gamma rays having energies above a predetermined level comprising the steps of: exposing to the emanations from said formation a substance which interacts selectively with gamma rays above said level to produce neutrons but does not so interact with gamma rays below it; causing said neutrons to come into contact with a substance which reacts selectively therewith to produce heavy, positively-charged, strongly-ionizing particles; causing said ionizing particles to come into contact with an ionizable gas in an electric field of suitable intensity to produce relatively stronger discharge impulses for electron avalanches started by the strongly ionizing heavy particles than for any which may be started by electron byproducts of gamma rays; and applying all of said impulses to an impulse-sensitive electrical circuit to separate the stronger impulses from the weaker.

References Cited in the file of this patent

UNITED STATES PATENTS

| Number | Name | Date |
|---|---|---|
| 2,288,718 | Kallmann et al. | July 7, 1942 |
| 2,408,230 | Shoupp | Sept. 24, 1946 |
| 2,464,930 | Herzog | Mar. 22, 1949 |
| 2,476,810 | Brunner et al. | July 19, 1949 |
| 2,508,772 | Pontecorvo | May 23, 1930 |

OTHER REFERENCES

Rev. of Scientific Instruments—Evans et al., December 1936, vol. 7, pp. 441–449.

Detection of Neutrons Liberated from Beryllium by Gamma Rays—Szilard et al., Nature, September 29, 1934, vol. 134, pp. 494–495.